Figure 1:
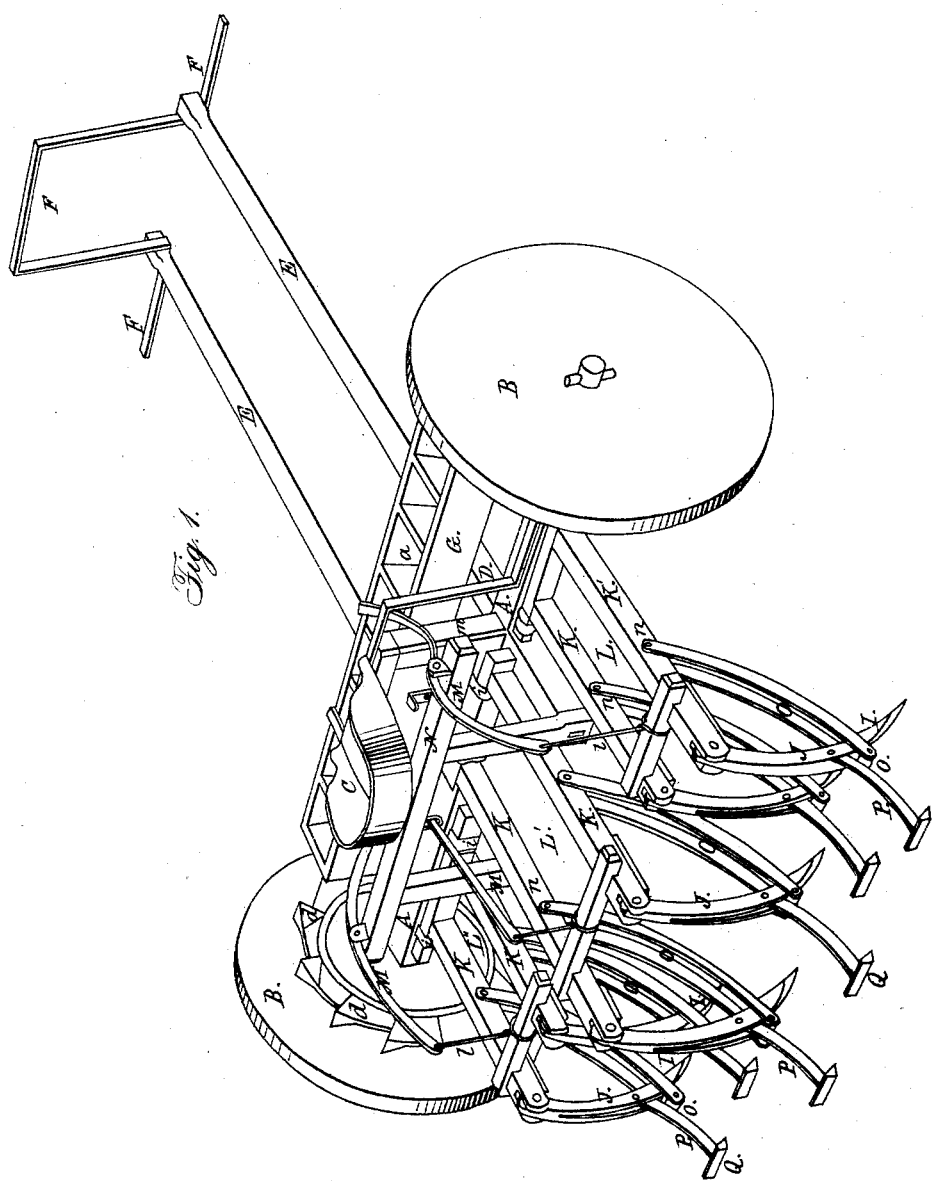

2 Sheets—Sheet 1.

W. MAY.
Grain-Drill.

No. 30,447. Patented Oct. 16, 1860.

Witnesses:
Albert M. Mann
Henry Heck

Inventor:
William May

W. MAY.
Grain-Drill.
No. 30,447.
2 Sheets—Sheet 2.
Patented Oct. 16, 1860.
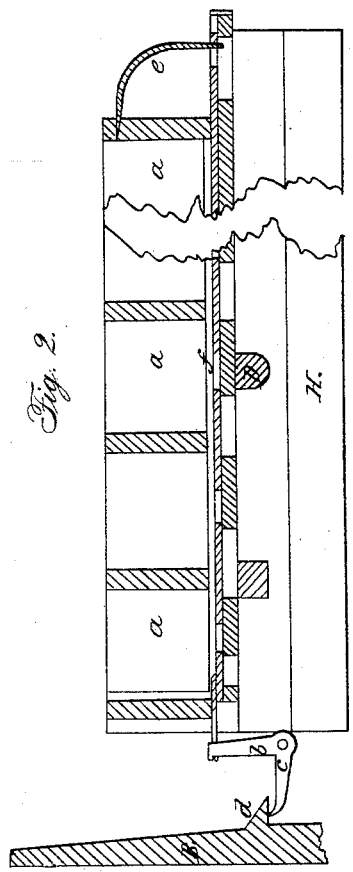
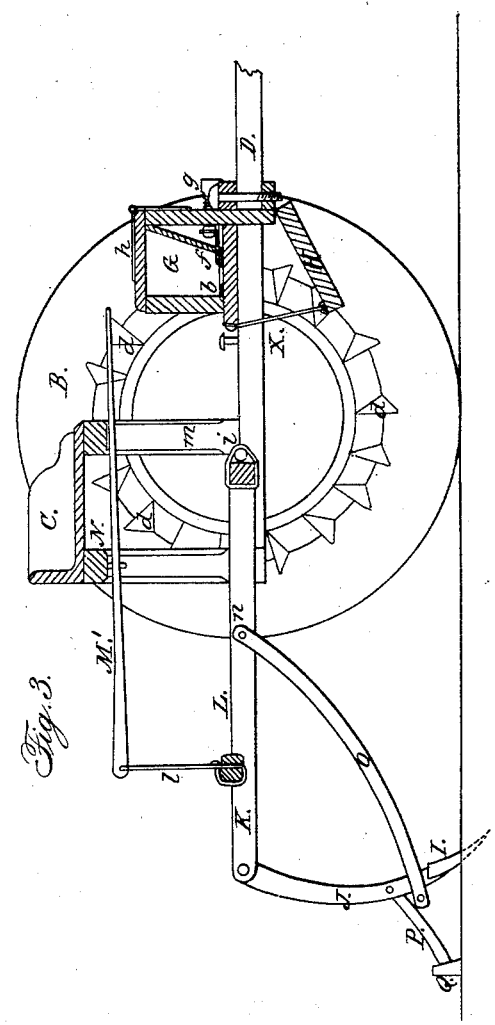
Witnesses:
Alberti M Mahen
Henry Heck
Inventor:
William May

UNITED STATES PATENT OFFICE.

WILLIAM MAY, OF WINCHESTER, OHIO, ASSIGNOR TO HIMSELF AND JEROME DE BRUIN, OF SAME PLACE.

IMPROVEMENT IN CULTIVATORS.

Specification forming part of Letters Patent No. 30,447, dated October 16, 1860.

*To all whom it may concern:*

Be it known that I, WILLIAM MAY, of Winchester, in the county of Adams and State of Ohio, have invented certain new and useful Improvements in Agricultural Implements, by which I make a Sower and Cultivator Combined; and I hereby declare that the following is a true and exact description of the same, reference being had to the annexed drawings, forming part of this specification.

Figure 1 is a perspective view of the whole machine. Fig. 2 is a vertical longitudinal section of the seed-box, and Fig. 3 is a vertical section through the machine.

A is the central cross-piece of the machine, which at its ends forms two axles for the wheels B, that support it and keep it above the ground. On A there is elevated the driver's seat C, and from the position at which the supports of the driver's seat rise two pieces of wood, D, go forward, and to these the shafts E are hinged. The shafts at their forward extremity are connected together by a cross-bar, F, of the shape shown, so that when two horses are employed to draw the machine their whiffletrees are attached to the extreme ends, and there is space in the center to pass over the row of corn and allow it to pass through uninjured, and one horse only can also be hitched between the shafts when the work requires no more.

Resting on D, capable of sliding thereon to or from the driver's seat, is a seed-box, G, divided into compartments $a$, and in each compartment there is a perforation, over which a similarly-perforated seed-slide, $b$, works or is reciprocated to allow of seed being discharged by means of a bell-crank lever, one arm of which, $b'$, is connected with the slide, and the other, $c$, is acted upon by the radial ratchet $d$, which I will now describe.

On the inside of one wheel B there are a series of ratchet-teeth, $d$, placed, radiating from the hub to the periphery, and this bell-crank, being acted upon by each of these as the wheel rotates, as seen in Fig. 2, gives the necessary motion to the seed-slide $b$. As these teeth, from their radial arrangement, become farther and farther apart, the motion which they give to the bell-crank depends in extent entirely to its position between the periphery and the hub. Therefore the seed-box is made to slide back and forth, carrying the bell-crank with it, and thus regulating the amount of seed delivered.

On the opposite end of the seed-box to the bell-crank a spring, $e$, is secured, and its free end catches into a recess in the end of the seed-slide, and thus the seed-slide is brought back when the ratchet-tooth has released the bell-crank and one portion of seed has been discharged. The amount of seed discharged is not only regulated by the motion of which the seed-box itself is capable on D, but the apertures in the seed-slide can be made larger or smaller, to discharge more or less seed as required, by having their width controlled by a slide, $f$, which lies over the seed-slide in the box, and which can be moved from the outside of the seed-box by two screws, $g$, to which it is connected, and by operating which the available width of the apertures in the seed-slide can be controlled.

Hinged to the front of the seed-box, and being rather wider than it, is a distributing-platform, H, which by means of a link, $x$, can be connected to the back of the seed-box and placed at any suitable angle in relation to the bottom of the seed-box that may be desired. The grain in falling out of the seed-box drops on this board or platform, which from its inclination and slight vibration consequent on the motion of the machine distributes the grain evenly on the ground.

When it is not desired to use the seeding arrangement it can be moved far enough forward to place the bell-crank out of the reach of the ratchets, and so will not be operated.

The seed-box is of course provided with a cover, $h$, to prevent the seed shaking out.

The cultivators I are six in number, and one attached to curved slotted bars J, which are pivoted to the ends of the side pieces, K′, of frames L′, which are hinged at the back to the cross-piece A of the machine by collars $i$. There are three pawls, L L′ L″, each having two side pieces, one, K′, slightly longer than the other, K, so that in each couple of cultivators one is slightly in advance of the other.

The back cross-piece of each frame is connected by a link, $l$, with levers M M′ M″, which have their fulcra on the frame N, that rises from D, and also supports the back of the driver's seat. One of these levers passes each side of the driver and one between his legs, so that without moving from his seat he can elevate either one or all of the frames from the ground, and so release the cultivators from their work. In the side posts of the driver's seat m there are holes and pegs or any other device for holding down the levers when the driver wishes to retain the cultivators in their elevated position.

The slotted bars J, which carry the cultivators I, can move between two curved bars, O, which are pivoted to the side pieces of the frame, as at n, and have at their outer extremity a small roller, o, which prevents the cultivators being forced farther back than they should and compels them in a measure to keep to their work. The roller end of the curved bars O rest on the top of the cultivators I.

In the slot of the bar J, just above the cultivator, there is provided another curved bar, P, which rests on the roller o, and has on its end a weight, Q, which acts as a lever in keeping the bars O upon their respective cultivators.

Should there occur any obstruction in the ground through which the cultivator is passing—such as stones, &c.—that would in ordinary cases tend to break the parts or disarrange the machine, in this case will only cause the cultivator I to press with sufficient force on the roller o to elevate the curved bar P and weight Q, throwing the bar into the slot in J by causing the roller o to ascend on the curved back of J and allowing the cultivator I to pass freely over any obstruction, and the moment it is passed the weight Q, exercising its leverage by its bar P on the roller o, and thus pressing the cultivator back into the ground without interfering in any way with the action of the other cultivators or even the next cultivator on the same frame.

In cultivating the sides of rows the center frame would be elevated by the driver to be free from the corn, and the two side frames, L and L'', would perform the necessary operation; or it can be used in any convenient way its owner might require.

It will be seen that this machine, while combining two of the most useful of agricultural machines, also combines them in the most convenient form, and also introduces novelties in such in their construction and operation which make it of great value to the agriculturist.

Having thus fully described my invention, what I claim, and desire to secure by Letters Patent, is as follows:

The curved bar P, carrying weight Q, pressing on the roller o, in connection with the curved bars J and O, substantially as and for the purposes shown and described.

WILLIAM MAY.

Witnesses:
A. McMEEKIN,
HENRY MEEK.